(12) United States Patent
Reinig et al.

(10) Patent No.: US 7,734,856 B2
(45) Date of Patent: Jun. 8, 2010

(54) METHOD FOR OPERATING A PLURALITY OF ARBITERS AND ARBITER SYSTEM

(75) Inventors: Helmut Reinig, Isen (DE); Soeren Sonntag, Munich (DE)

(73) Assignee: Lantiq Deutschland GmbH, Nuebiberg (DE)

( * ) Notice: Subject to any disclaimer, the term of this patent is extended or adjusted under 35 U.S.C. 154(b) by 249 days.

(21) Appl. No.: 11/842,965

(22) Filed: Aug. 22, 2007

(65) Prior Publication Data

US 2009/0055566 A1 Feb. 26, 2009

(51) Int. Cl.
*G06F 13/36* (2006.01)
(52) U.S. Cl. .................................. 710/243; 710/120
(58) Field of Classification Search ......... 710/110–119, 710/240–244, 40, 43
See application file for complete search history.

(56) References Cited

U.S. PATENT DOCUMENTS

| | | | |
|---|---|---|---|
| 5,280,591 A | 1/1994 | Garcia et al. | |
| 5,301,333 A | 4/1994 | Lee | |
| 6,032,218 A | 2/2000 | Lewin et al. | |
| 6,148,002 A | 11/2000 | Patel et al. | |
| 6,311,249 B1 * | 10/2001 | Min et al. | 710/111 |
| 6,338,121 B1 * | 1/2002 | Nunez et al. | 711/140 |
| 6,487,213 B1 | 11/2002 | Chao | |
| 6,763,418 B1 | 7/2004 | Chou et al. | |
| 6,954,812 B2 * | 10/2005 | Lavigne | 710/243 |
| 7,143,219 B1 * | 11/2006 | Chaudhari et al. | 710/111 |
| 2003/0223453 A1 | 12/2003 | Stoler et al. | |
| 2004/0103231 A1 * | 5/2004 | Zhu | 710/113 |
| 2004/0133724 A1 | 7/2004 | Chae | |
| 2004/0210696 A1 * | 10/2004 | Meyer et al. | 710/240 |
| 2004/0250003 A1 | 12/2004 | Chang | |
| 2006/0236010 A1 * | 10/2006 | O'Connor et al. | 710/111 |
| 2009/0006693 A1 * | 1/2009 | Dunn et al. | 710/244 |

FOREIGN PATENT DOCUMENTS

JP 203256358 A1 9/2003

OTHER PUBLICATIONS

John L. Hennessy and David A. Patterson, 7.3 Buses-Connecting I/O Devices to CPU/Memory, Computer Architecture A Quantitative Apporach, Published 1990. Third edition 2003, pages No. 692-702, Morgan Kaufmann Publishers, San Francisco, CA (US).
Dr. phil. Georg Pflug, 3.1.2.1. Die Round-Robin (Rr-) Regel, Stochastische Modelle in der Informatik, 1986, pp. No. 102-104, B. G. Teubner, Stuttgart, DE.
Francis Cottet et.al.:, 1.2.2 Scheduling: definitions, algorithms and properties (pages No. 13-17) and 1.2.3 Scheduling in classical operating systems (pages No. 17-19), Scheduling in Real-Time Systems, 2002, John Wiley & Sons Ltd., West Sussex, GB.

* cited by examiner

*Primary Examiner*—Raymond N Phan
(74) *Attorney, Agent, or Firm*—SpryIP, LLC (57) ABSTRACT

Embodiments related to arbitration are described and depicted.

18 Claims, 12 Drawing Sheets

Cycle 4

*Fig. 6d*

Cycle 5

*Fig. 6e*

Cycle 6

METHOD FOR OPERATING A PLURALITY OF ARBITERS AND ARBITER SYSTEM

BACKGROUND

In many technical fields, resources are shared by more than one units or devices. To give some examples, in a master slave configuration a plurality of masters may share a common slave, a plurality of units may share a common bus, a plurality of processors may share a common memory or pieces of information such as data packets may be transferred over a common data channel. When more than one unit requests to get access to the shared resource at the same time, a conflict exists between the units requesting access since at a given time only one of the units can get access while the other has to be prevented from accessing.

To address this problem, arbitration is used. Arbitration is a process, where a unit is given priority over another unit (or a plurality of other units). Many arbitration techniques with different degrees of fairness for the requesters and different degrees of complexity are known. Arbitration may take for example into account the number of previous requests by a given unit or the identity of the unit (i.e. the identity of the port. Furthermore, fair arbitration techniques may take into consideration that requesters are handled fair and one requester is for example not blocked by another requester. Fair arbitration techniques include for example round robin arbitration (RR), weighted round robin (WRR) or deficit round robin (DRR).

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, units, modules, devices etc. may have assigned the same reference number.

As will be described set forth below in more detail, embodiments of the present invention provide for arbitration by using a plurality of arbiters or sub-arbiters. The plurality of sub-arbiters may be arranged in a hierarchical architecture and may be operated in pipelined or non-pipelined operation as will become clearer by the appended figures and the description explained below.

Figure 1:
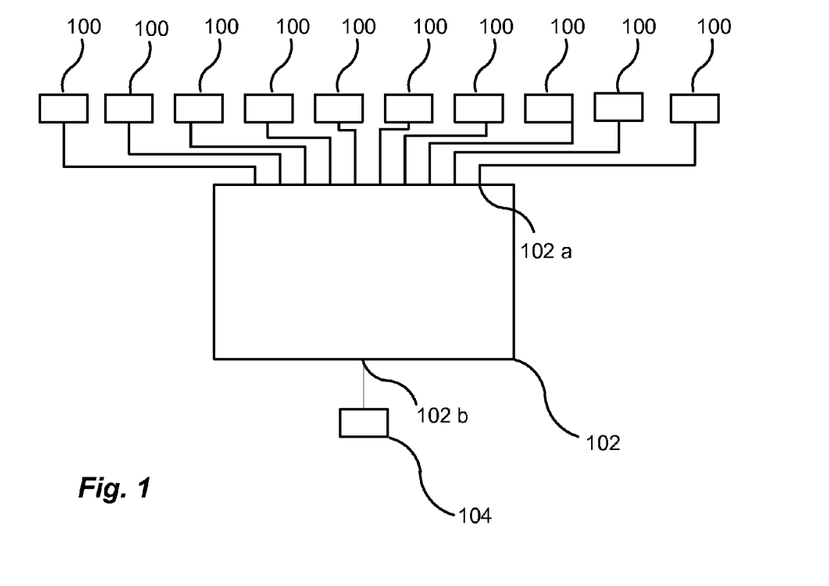
FIG. 1 shows a block diagram according to an embodiment of the present invention.

Referring now to FIG. 1, a basic block diagram of embodiments of the present invention includes a plurality of requesters 100 which are coupled to a plurality of inputs 102a of an arbitration system 102 to transfer requests to the arbitration system 102. An output 102b of the arbitration system 102 is coupled to a shared resource 104 to allow data transfer from the requester granted for access to the shared resource.

As will be described below in more detail, arbitration system 102 may according to embodiments be comprised of a plurality of arbiters or sub-arbiters which may be operated in both, a pipelined operation and non-pipelined operation. The plurality of arbiters may be implemented in a hierarchical architecture.

The plurality of requesters 100 may include any device, unit, circuit etc. which shares the resource 104 with one or more other devices, units, circuits etc. The plurality of requesters 100 may for example include but is not limited to memory controllers, processors and processing resources including dedicated processors, bus controllers, network controller including but not limited to wired network controller, wireless network controller, Ethernet network controllers etc, shared bus, shared memory resources including caches, DRAM etc, application accelerators, data acquisition devices etc. The plurality of requesters may comprise only one type of requesters, for example only a plurality of processors of a same type or may include different types of requesters, for example processors and dedicated processors.

The shared resource 104 may be any device, unit, circuit etc. which can be shared by more than one device, unit or circuit, etc. The shared resource may for example be a memory, a bus, a data port, a data channel etc. According to embodiments, the plurality of requesters and the shared resource may form a master-slave system, wherein the plurality of requesters are masters of a same or different type and the shared resource is a slave.

Figure 2:
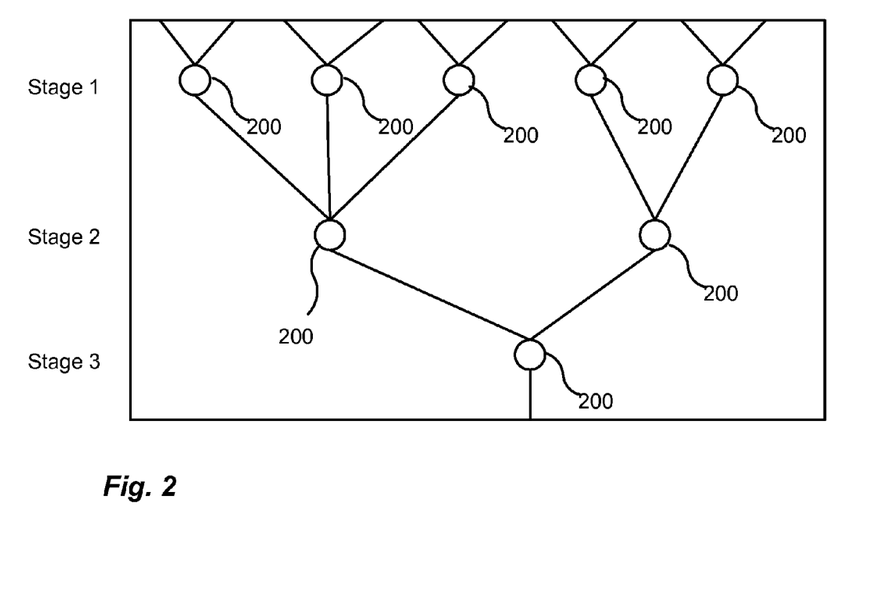
FIG. 2 shows a block diagram according to an embodiment of the present invention.

Referring now to FIG. 2, an embodiment of an arbitration system will be described in more detail.

FIG. 2 shows an exemplary implementation of the arbitration system 102 in hierarchical arbitration architecture according to an embodiment of the present invention. The hierarchical arbitration architecture comprises a plurality of arbitration nodes 200. The plurality of arbitration nodes 200 is arranged in different hierarchical stages such that each of the arbitration nodes 200 is assigned to one stage of the hierarchical arbitration architecture. An arbitration node assigned to a stage, is connected downwards in the hierarchy to the outputs of one or more arbitration nodes of a lower-level stage and upwards in the hierarchy to an arbitration node of a higher-level stage. The arbitration nodes of the lowest-level stage are connected to the requesters.

As can be seen from FIG. 2, the arbitration nodes form a tree-like structure wherein each node is coupled to a node of a higher stage except that the arbitration node at the highest level, i.e. the arbitration node at the top of the hierarchical architecture is coupled to the output 102b of the arbitration system 102. Furthermore, the arbitration nodes 200 at the lowest level stage (Stage 1) are coupled to the inputs 102a of the arbitration system 102. Each of the arbitration nodes 200 at the lowest-level stage can be coupled to one or more of the requesters 100 to receive request signals from each of requesters 100.

While FIG. 2 shows an exemplary implementation with three stages wherein the first stage comprises five arbitration nodes and the second stage comprises two arbitration nodes, it is to be noted that the number of stages and the number of arbitration nodes within one stage may be varied in other embodiments. Furthermore, the number of arbitration nodes which are assigned or coupled to an arbitration node of a higher level stage may be varied in other embodiments. Furthermore, the number of arbitration nodes assigned to an arbitration node at a higher level may be the same or may be different for each arbitration node of a particular stage. For example, as shown in FIG. 2, one of the arbitration nodes at stage 2 has assigned three arbitration nodes of stage 1 while the other arbitration node has assigned only two arbitration nodes of stage 1.

According to embodiments which will be described in more detail below, the hierarchical arbitration system 102 may include hierarchical arbitration request architecture and hierarchical data path architecture. To implement the hierarchical request and the hierarchical data path architecture, according to one embodiment, each of the arbitration nodes 200 comprises an arbitration request node implemented by an arbiter (or arbiter circuit) 300 and a data path request node implemented in an embodiment by a multiplexer 302 shown in FIG. 3. The arbiter 300 comprises a plurality of inputs 300a corresponding to the number of arbitration nodes at the next lower stage assigned to the respective arbitration node such that each input 300a is connected to a corresponding output of the arbiter 300 at the next lower-level stage. Furthermore, an output 300b of the arbiter 300 is connected to an input of an arbiter 300 corresponding to an arbitration node at a higher-level stage.

Figure 3:
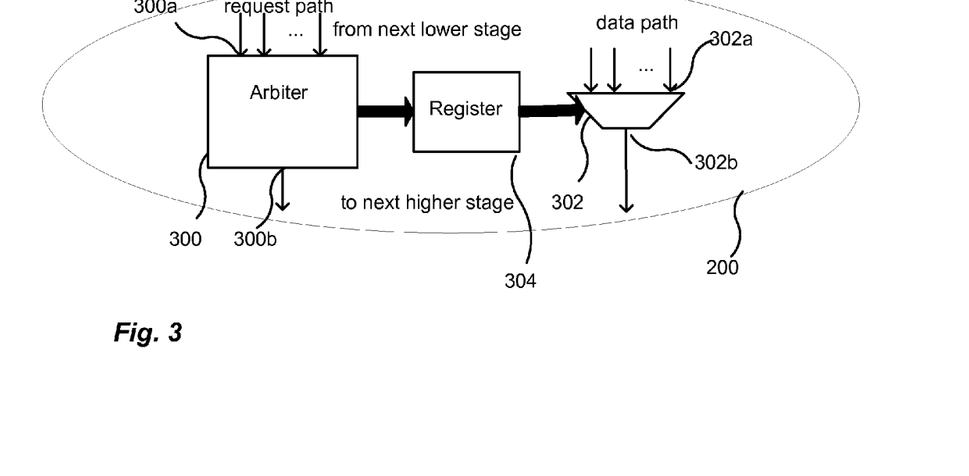
FIG. 3 shows a block diagram according to an embodiment of the present invention.

The multiplexer 302 comprises a plurality of data path inputs 302a coupled to outputs of multiplexers at lower-level stages and an output 302b coupled to an input of a multiplexer at a higher-level stage.

The arbiter 300 is coupled to a register 304 to store information identifying which of the input ports competing in an arbitration process of the arbiter 300 has been granted. The register 304 is further coupled to a control input of the multiplexer 302 to switch the data path corresponding to information stored in the register. According to embodiments, the multiplexers are switched according to the information stored in the register 304.

By implementing the above described arbitration nodes 200 in a hierarchical arbitration architecture as shown in FIG. 2, a hierarchical arbitration request architecture for making grant decisions in arbitration processes and a hierarchical data path architecture for transferring data from granted requesters to the shared resource is obtained.

Figure 4A:
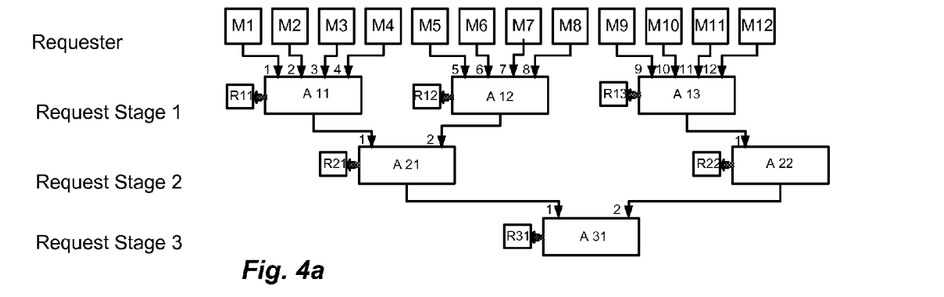
FIGS. 4a and 4b show block diagrams according to an embodiment of the present invention.
Figure 4B:
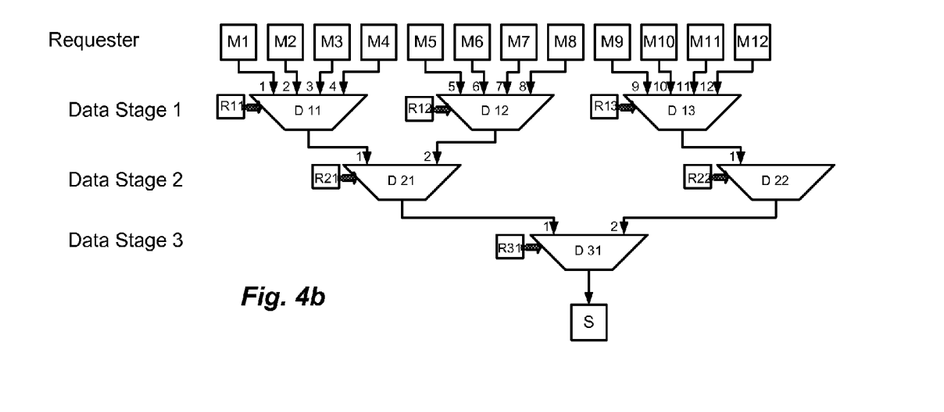

FIGS. 4a and 4b show an exemplary embodiment of hierarchical arbitration request architecture and hierarchical data path architecture. FIGS. 4a and 4b correspond to a system with three arbitration nodes at stage 1 and two arbitration nodes at stage 2. Each of the arbitration nodes at stage 1 has four inputs corresponding to the number of requesters M1 . . . M12 assigned to a respective one of the arbitration nodes.

The plurality of arbiters, the plurality of requesters and the plurality of multiplexers of the arbitration system may according to embodiments provided on a same chip. Furthermore, according to embodiments, the arbitration system may be clocked synchronously.

The arbiter 300 may be provided fully in hardware (hardware circuits on chip), or partially in hardware and software/firmware. Furthermore, any known arbitration technique may be implemented by the arbiter 300 in order to provide arbitration among its inputs. For example, fair arbitration techniques such as round robin arbitration (RR), weighted round robin (WRR) or deficit round robin (DRR) may be implemented by arbiter 300. According to embodiments, the arbiter 300 may comprise a "memory" to take into account "older" active requests which have not yet been granted by the arbiter 300.

A first exemplary operation of the arbitration system of FIGS. 4a and 4b corresponding to a pipelined operation mode will now be described with reference to FIGS. 5a to 5f and FIGS. 6a to 6f.

The pipelined operation mode or pipelining operation or pipeline mode corresponds to an operation wherein the process to provide grant for a given requester is split into a plurality of sub-processes each performed at one of the arbiters in the arbitration system. Each sub-process receives as input the result from a previous stage and performs its dedicated sub process. In other words, the process is handed in the pipeline from one stage to another such that by the last sub-process the total process, i.e. the overall arbitration for the request reaching the top-level, is finished.

Pipelining operation is performed in a hierarchical arbitration system in that at a given cycle at each stage of the hierarchical arbitration system, arbitration is processed among the inputs of the arbiters. Based on a grant given by an arbiter to one of the inputs, a signal, i.e. pipeline request, is then transferred as input signal to an arbiter of the next higher stage where it may compete with other input signals from other arbiters. In the next cycle, the arbiter at the next higher-level stage then arbitrates based on the requests which are active at this arbiter, i.e. which have been received and/or stored by the arbiter. The branch which has been granted by the arbiter is stored in the corresponding register. As the computing time for an arbiter increases significantly with the number of inputs, the requirements for computing time for each arbiter to finish arbitration within one clock cycle are released in the hierarchical arbitration system with pipelining operation, compared to providing a single arbiter for all requesters. This allows for example operation when many requesters and short clocking periods are encountered. The pipelined operation will become clearer by regarding FIGS. 5a to 5f and 6a to 6f showing an exemplary pipelined operation.

Figure 5A:
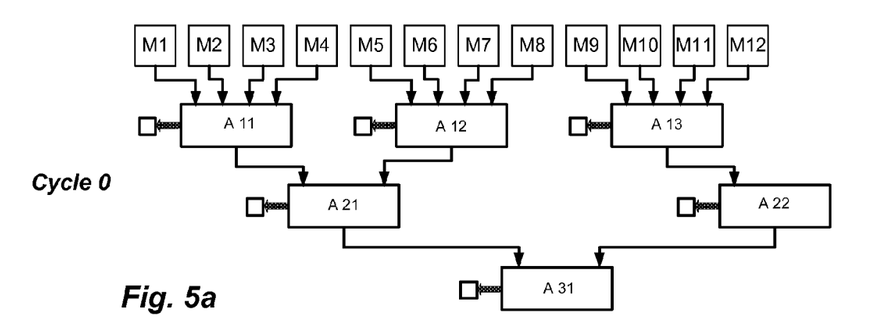
FIGS. 5a to 5f shows exemplary block diagrams to illustrate an operation according to an embodiment of the present invention.

FIG. 5a shows the arbitration request architecture at a cycle 0 when all of the plurality of arbiters are idle, for example after a start-up. Please note that in the following figures, the inputs of arbiter A11, A12 and A13 at the first stage are labeled and referred to according to the number of the requester coupled to the input, i.e. arbiter A11 has inputs 1 to 4, arbiter has inputs 5 to 8 and arbiter A13 has inputs 9 to 12. For arbiters A21, A22 and A31 all containing in the described embodiment two inputs, the first input is referred to as 1 and the second is referred to 2, as seen in FIG. 5a.

Figure 5B:
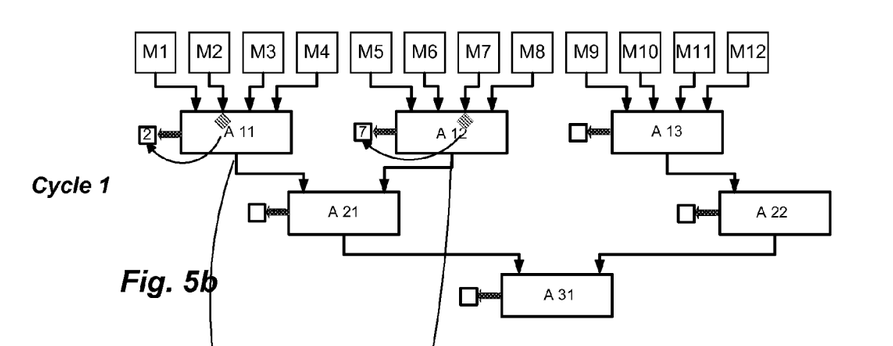

At cycle 1, requester M2 and requester M7 both output a request signal to corresponding inputs of arbiters A11 and A12 at stage 1 of the arbitration system. During cycle 1, arbiter A11 performs an arbitration process and grants the request at the second input corresponding to M2 as no other request is active for arbiter A11 in cycle 1. Similar, during cycle 1, arbiter A12 performs an arbitration process and grants the request at the second input corresponding to M7 as no other request is active for arbiter A12 in cycle 1. After the arbitration, for example at the end of cycle 1, the result indicating which input has been granted, i.e. 2 for arbiters A11 and 7 for A12, is written to the registers corresponding to arbiters A11 and A12 which is indicated in FIG. 5b by arrows. Thus, it is to be noted that the information shown in the FIGS. 5a-5f for a respective cycle is actually the information valid at the end of the cycle. This information will then be present at the respective multiplexer at the beginning of the next cycle to allow data transfer corresponding to the information in the next cycle.

In addition, each of the arbiters A11 and A12 output a request signal to arbiter A21 of the next higher stage which will be arbitrated in the next cycle. The request granted thereby drops one stage further in the hierarchical system.

Figure 5C:
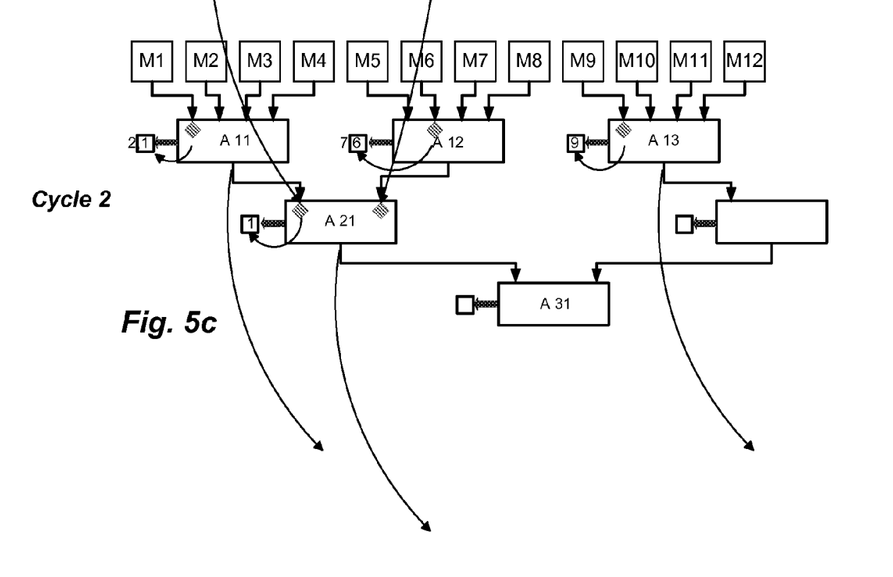

Referring now to FIG. 5c, at cycle 2, arbiter 21 has two requests active corresponding to the inputs coupled to arbiters A11 and A12. Transfers of requests from arbiters are indicated in the Figures also by arrows. As can be seen in FIGS. 5a and 5b, due to the pipeline operation, an "intercycle" arrow is shown indicating the transfer from arbiter A11 to arbiter A21.

In the arbitration process of cycle 2, arbiter A21 then grants the request coming from arbiter A11 and the information corresponding to the granted input, i.e. 1, is stored in the register of A21 after the arbitration is finished, for example at the end of the cycle. A request signal is then output by arbiter A21 to the arbiter A31 at the next higher-level stage. Furthermore, in cycle 2 new requests are output by requesters M1, M6 and M9 to arbiters A11, A12 and A13, respectively, and are granted in the arbitration process at the respective arbiters. At the end of cycle 2, information regarding the granted requests is transferred to the corresponding registers.

Figure 5D:
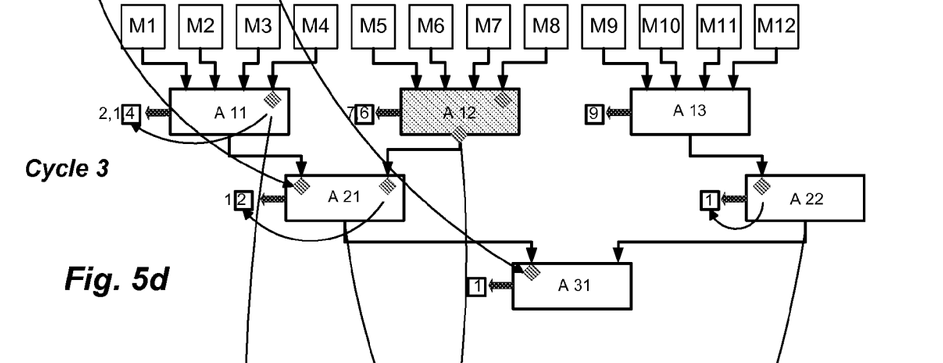

In the next cycle 3 shown in FIG. 5d, the request output from arbiter A21 has been transferred to the top-level arbiter A31 and is therefore an active request at the input of arbiter A31 coupled to arbiter A21. Arbiter A31 grants this request as no other requests are active for this cycle. Furthermore, new requests from requesters M4 and M8 are received at arbiters A11 and A12 and are granted in the respective arbitration process.

At arbiter A21, both inputs corresponding to A11 and A12 have active requests. However, it is to be noted that the active request at the input corresponding to A12 is the old request already active at cycle 2 which has not been granted in the arbitration process of cycle 2 at arbiter A21 while the request at the input corresponding to A11 is the new request transferred from A11. Arbiter A21 arbitrates among the requests and gives grant to the input corresponding to A12, thereby removing the active request initiated from A12. Furthermore in cycle 3, arbiter A22 processes arbitration and grants the only active request from A13. As described above, after granting, each of the arbiters outputs a request signal to the next higher stage unless there is an old request blocking the output of the request to the next stage as will be described below.

Furthermore, in cycle 3 new requests are output by requesters M1, M6 to arbiters A11 and A12. It is to be noted here, that arbiter A11 performs in cycle 3 arbitration while arbiter A12 is blocked for arbitration in this cycle which is indicated by a gray color of arbiter A12. Arbiter A12 is blocked because only one request can be active at a given time (cycle O at one input). Thus, the request granted by arbiter A12 in the previous cycle 2 can not be transferred to arbiter A21 because arbiter A21 did not grant the request active at the input corresponding to arbiter A12 in the previous cycle and this old request is therefore still active at arbiter A12. Instead of outputting the request to the next stage, the request is therefore maintained at the output of arbiter A12 in cycle 3 as indicated in FIG. 5d. Furthermore, referring still to FIG. 5d, as no arbitration is performed in arbiter A12, the information stored in the register of A12 is not changed. In the registers corresponding to the arbiters A11, A21 and A31, the information stored in the corresponding registers are updated at the end of the cycle according to the inputs granted in the respective arbiters.

Figure 5E:
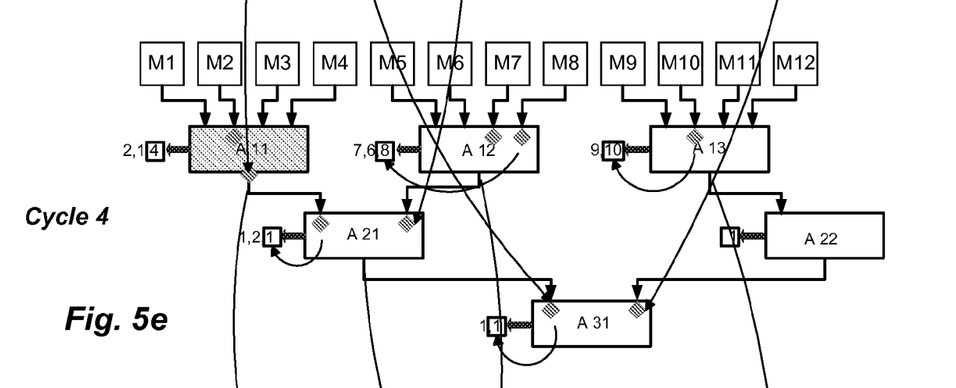

Advancing now to cycle 4 shown in FIG. 5e, new requests from requesters M2, M7 and M10 are received at arbiters A11, A12 and A13. Furthermore, at arbiter A12, the request output from M8 at cycle 3 is still active as no arbitration has been performed in cycle 3 by arbiter A12. Arbiter A12 therefore arbitrates among the requests from M7 and M8 and grants the request from M8 as outlined in FIG. 5e.

Furthermore, the request from arbiter A12 maintained in cycle 3 at the output of arbiter A12 has now been transferred to the corresponding input of arbiter A21 while the old request at the input corresponding to A11 which has not been granted in cycle 3 is still active.

In view of the above, arbiter A11 has not been able to transfer the request from A11 to A21 and therefore the request is maintained at the output of arbiter A11 as outlined in FIG. 5e and arbiter A11 is blocked in this cycle.

Arbiter A13 having only one active request from M10 grants this request. Furthermore, arbiter A31 having in cycle 4 requests at all inputs grants the request at the input corresponding to A21.

Figure 5F:
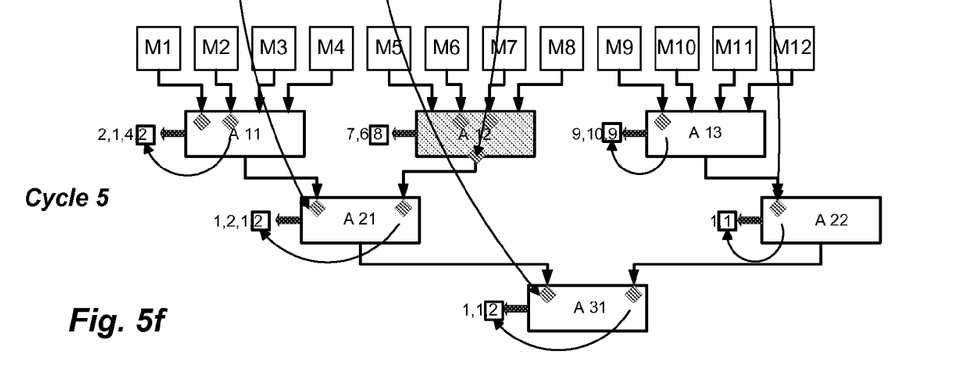

In cycle 5 shown in FIG. 5f, new requests are received from requesters M1, M6 and M9. Furthermore, arbiter A12 having now active requests from all ports arbitrates grants the input coupled to A11. Arbiter A21 having one active request from arbiter A13 grants the arbiter A11 and arbiter A31 having two active requests from A21 and A22 gives grant to the input coupled to A22.

It is to be noted that in the pipelined operation, as each of the arbiters at one stage has to wait for the input of the arbiter of the lower-level stage, it takes for an arbitration system of hierarchical level n at least n cycles for a request to advance through the pipeline. Therefore, in the above example, the first data transfer from a requester, i.e. requester M2 to the shared resource begins at cycle n+1, in the above example at cycle 4. Furthermore, it is to be noted that the operation shown is FIGS. 5a-5f is only an exemplary pipeline operation and it is to be understood that many other ways exist to implement pipeline operation of arbiters.

The data transfer in the hierarchical data path system shown in FIG. 4b from the requesters granted by the system to the shared resource will now be described with respect to FIGS. 6a to 6f.

Figure 6A:
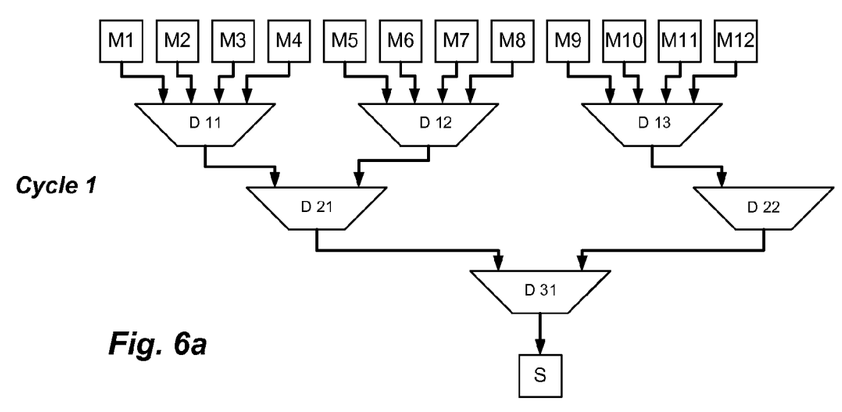
FIGS. 6a to 6f shows exemplary block diagrams to illustrate an operation according to an embodiment of the present invention.
Figure 6B:
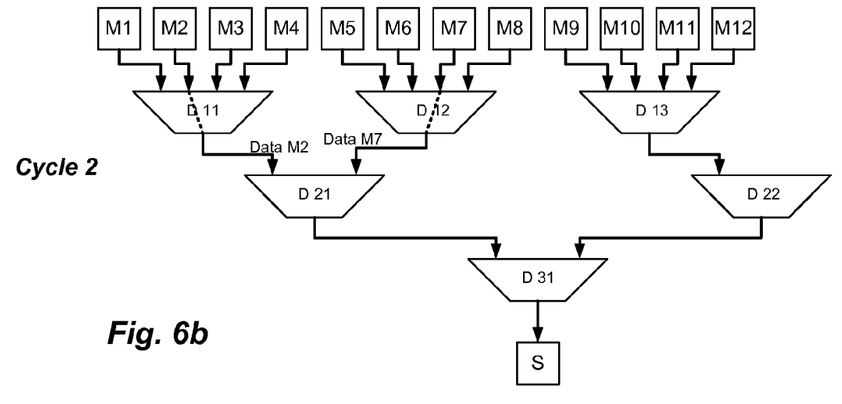

FIG. 6a shows the data path system at cycle 1. It is to be noted here that FIG. 6a starts at cycle 1 while FIG. 5a shows the arbitration request system at cycle 0 which takes into account that data can be processed after a grant by the overall system only one cycle later. At cycle 1, all of the multiplexer are in an idle or indefinite state as at the beginning of cycle 1 no information is stored in the registers which would allow the multiplexers to make corresponding switchings. Advancing now to cycle 2 shown in FIG. 6b, the register associated with A11 contains at the beginning of cycle 2 the information identifying input 2 as the granted input, compare for the information stored in the registers shown FIG. 5b. Thus, multiplexer D11 sets its second input active. Furthermore, the register corresponding to A12 contains at the beginning of cycle 2 the information identifying input 7 as the granted input and multiplexer D12 sets the input corresponding to M7 active. The setting of the multiplexer D11 allows data from M2 to be transferred one stage further in the system, i.e. to the input of multiplexer D21 as shown in FIG. 6b. In addition, the setting of multiplexer D12 allows data from M7 to be transferred to the corresponding input of multiplexer D21.

Figure 6C:
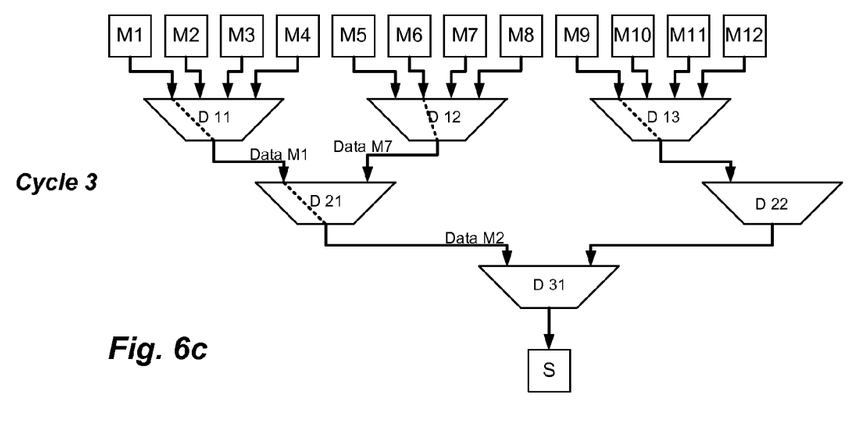

Advancing now to cycle 3 shown in FIG. 6c, multiplexer D11 sets the input corresponding to M1 active, multiplexer D12 sets the input corresponding to M6 active and multiplexer D21 sets the input coupled to D11 active in correspondence with the information stored in the registers, compare for FIG. 5c. In addition, multiplexer D13 sets its input corresponding to M9 active. The data from M2 is then transferred in accordance with the setting of multiplexer D21 one stage further in the hierarchical data system, i.e. from the input of multiplexer D21 to the input of multiplexer D31, as outlined in FIG. 6c. Furthermore, data from M1 is transferred to the input of multiplexer D21 according to the setting of multiplexer D11. It is to be noted that no data is transferred from D12 to D21 as the old data M7 is still active at the input of multiplexer D21.

Figure 6D:
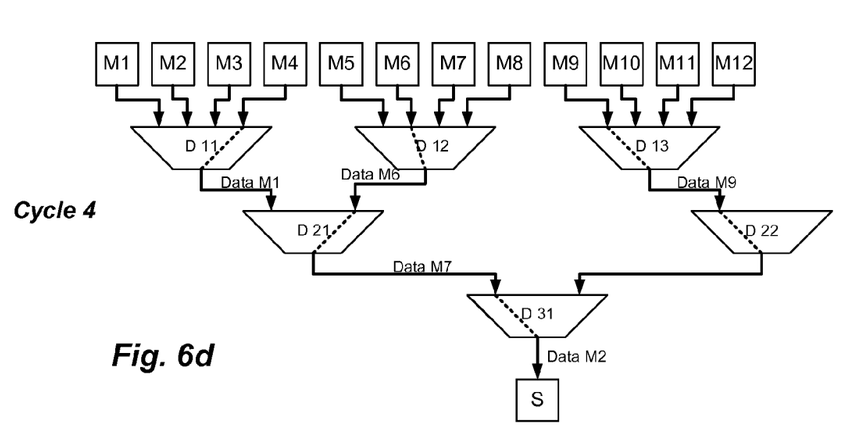

In cycle 4, shown in FIG. 6d, the multiplexers are set in correspondence with the information stored in its register (see FIG. 5c). It can be seen from FIG. 6d that with the setting of the top-level multiplexer a data path corresponding to a branch through the hierarchical data path system, i.e. a data path from requester M2 to the shared source has finally been completed. Data from requester M2 are therefore transferred in this cycle to the shared source.

Furthermore, data from M7 is transferred from multiplexer D21 to multiplexer D31 in accordance with the setting of multiplexer D21 while data from M6 is transferred to the input of multiplexer D21 and data from M9 is transferred to the input of multiplexer D22.

Figure 6E:
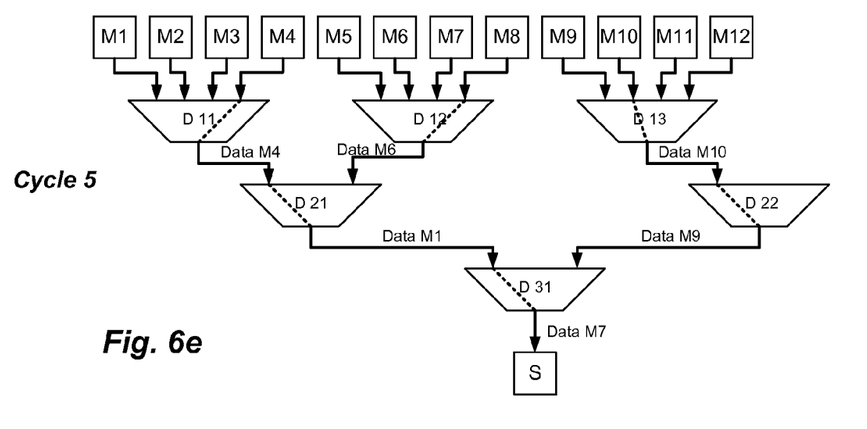

In cycle 5, shown in FIG. 6e, the data from M7 is finally transferred to the shared source while the data from M1, M4, M9 and M10 each advance one stage further in the data path system.

Figure 6F:
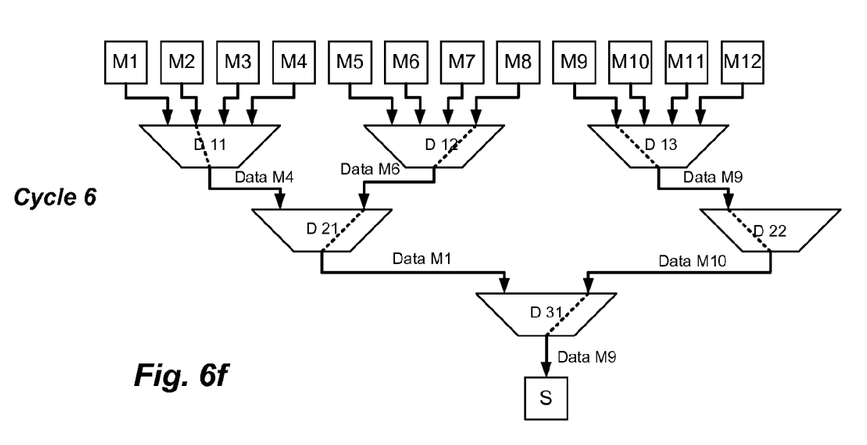

In cycle 6 shown in FIG. 6f, data from M9 is transferred to the shared source while data from M10 and M9 is transferred one stage further in the pipeline, i.e. from multiplexer D22 to the input of multiplexer D31 and from multiplexer D13 to the input of multiplexer M22.

As outlined above, in the pipelined operation, it takes at least n cycles for a request to advance through the pipeline. In embodiments of the present invention described set forth below, the arbitration system may not only be capable of providing pipelined operation but also to provide a fast arbitration when needed.

In embodiments as will be described below, the arbitration system may provide a selective non-pipelined arbitration of a request in at least a part of the arbiters when needed. The non-pipelined arbitration may be a parallel arbitration and may be selected when arbiters have been idle as will be described below. In parallel arbitration, a specific request of a requester or a specific request of an arbiter of a lower stage is concurrently present at more than one stage, i.e. more than one of the arbiters of the branch corresponding to the request (the branch, the request has to take) are deciding within one clock cycle (in parallel) whether this request can be given grant or whether another request is given grant. Please note that in the pipelined operation, the grant for a request is at a given time or cycle always decided at only one stage of the system and, if grant is given to the request, the request advances one stage further where it is decided in the next cycle. According to embodiments, the arbitration system is operated in a parallel mode when one or more arbiters have been idle in the cycle before, i.e. did not arbitrate in a pipelined operation on requests.

To selectively operate the arbitration system in a parallel operation mode, the arbitration nodes 200 shown in FIG. 3 are modified to include circuitry allowing the parallel or almost parallel feeding of different stages with requests. Parallel may be interpreted broadly such that the feeding of the requests to different stages may not be exactly at the same time but within a time period short compared to the cycle period or at least smaller than the cycle period. According to embodiments, the circuitry may be build from combinatorial circuitry such as OR-logic components, AND-logic components etc allowing the forwarding of request signals in short time as will be outlined below.

Figure 7:
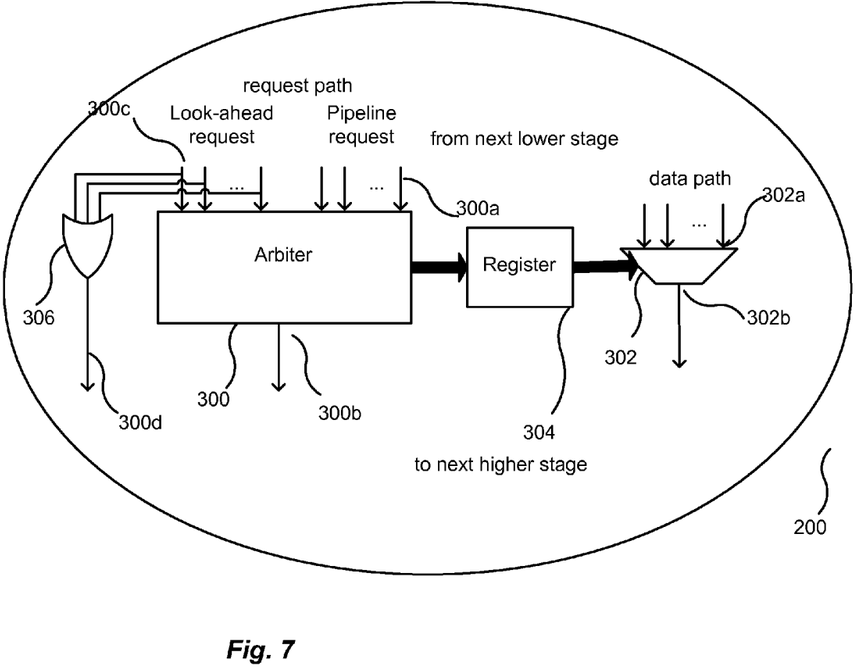
FIG. 7 shows a block diagram according to an embodiment of the present invention.

FIG. 7 shows one exemplary implementation to provide a parallel feeding of requests to multiple stages. In FIG. 7, distinguished from FIG. 3, the arbitration node 200 comprises an OR-logic component 306. The OR-logic component 306 has a plurality of inputs, wherein each input is associated with one of the arbitration nodes of the next lower level stage assigned to the arbitration node 200. As can be seen from FIG. 7, the arbitration node 200 comprises now in addition to the inputs 300a which are connected to outputs of arbiters of lower-level stages second inputs 300c. The inputs 300c are connected to nodes which are connected to the inputs of the OR-logic component 306 and to second inputs of the arbiter. Signals which are applied to the second inputs 300c are provided parallel to the second inputs of the arbiter 300 and to the inputs of the OR-logic component 306.

Thus, with the arbitration node shown in FIG. 7, two signals are transferred in the hierarchical arbitration request system. The first signal which is transferred from one stage to the direct next higher stage based on an arbitration process at the lower-level stage as has been already described with respect to FIGS. 3, 4, 5a-5f and 6a-6f. The first signal therefore corresponds to a pipelined operation and will be referred in the following as pipeline signal or pipeline request. The second signal is a signal which is also feed into the arbiter 300, however it is transferred by combinatorial circuitry in "parallel", i.e. within a short time period, to at least one further stage. The second signal can therefore be regarded and will be referred in the following as a look-ahead signal or look-ahead request. The second signal, which provides an OR-function of all inputs and is therefore provided when one or more signals are received at the input, can be regarded as a signal which indicates in a fast way to the higher stage that activity will be coming on this branch, thereby allowing the higher stage already to start to arbitrate on this request ahead of the receiving of the pipeline request.

The arbitration node 200 according to FIG. 7 therefore comprises two nodes in the arbitration request section. A first node being implemented by the plurality of first inputs 300a of the arbiter 300 to receive the first signals from lower-level arbitration nodes and being implemented by the output 300b of the arbiter 300 to transfer a signal to an arbitration node of a higher level. And a second node being implemented by the plurality of inputs 300c which receive the second signals from second nodes of lower-level arbitration nodes and being implemented by the output 300d provided to transfer the look-ahead request to a higher-level arbitration node.

As the arbiter 300 receives according to FIG. 7 for each lower-level arbitration node assigned to the arbitration node two signals, i.e. the pipeline request and the look-ahead request, the arbiter decides in operation which of the requests are valid requests or which of the requests are taken into consideration for arbitration.

According to one embodiment, the pipeline requests are absolutely prioritized over the look-ahead requests. In other words, when one pipeline request is received from any of the inputs 300a or is active because of a non-granted older pipeline request, all look-ahead requests will be discarded or are not regarded in the arbitration at this arbitration node. However, as the look-ahead signal is transferred to multiple other stages along the branch of the hierarchical system, the look-ahead signal may be taking into consideration at other stages, where no pipeline request is active.

Consequently, arbitration of pipeline requests is absolutely prioritized over arbitration of look-ahead requests and such that can be arbitrated only amongst other pipeline requests but not amongst look-ahead request and look-ahead requests can only arbitrated amongst each other, if they are allowed for arbitration. In other words, look-ahead requests are discarded when a pipeline request is applied at one of the inputs of a respective arbiter. This ensures, that the hierarchical system works in a pipelined operation mode when the pipeline is filled with pipeline requests and works in a parallel operation mode, when some or all of the arbiters are idle or have no active pipeline request.

It is to be noted that besides the above described strict separation of look-ahead requests and pipeline requests in the arbiter 300, other ways of operation may be provided in other embodiments and look-ahead requests and pipeline request may be mixed together in arbitration, by for example giving the look-ahead requests a weak priority.

It is further to be noted that pipeline requests are always generated at the output 300b of arbiter 300 when arbitration has been performed in the arbiter and the pipeline request is then transferred to the arbiter of the next higher-level as previously described herein. However, in case the arbiter at the next higher stage has been granted a look-ahead request in the previous cycle for this input, the pipeline request will be discarded in the next cycle, in order to avoid arbitration of doubled requests.

Arbiters of the lowest-level stage receive directly requests from the requesters. Therefore, instead of coupling the output 300a to the requester, for the arbiters of the lowest-level stage the input 300b is coupled to the requesters to receive the requests and generate look-ahead signals and to provide same in parallel to the arbiter for arbitrating the requests. Consequently, for the lowest-level arbiters, the input 300a may not be provided or may be clamped.

In order to give more insight in the above described look-ahead implementation, the example given in FIGS. 5a-5f and 6a-6f is applied in FIGS. 8a-f and 9a-f to the above described look-ahead implementation.

Figure 8A:
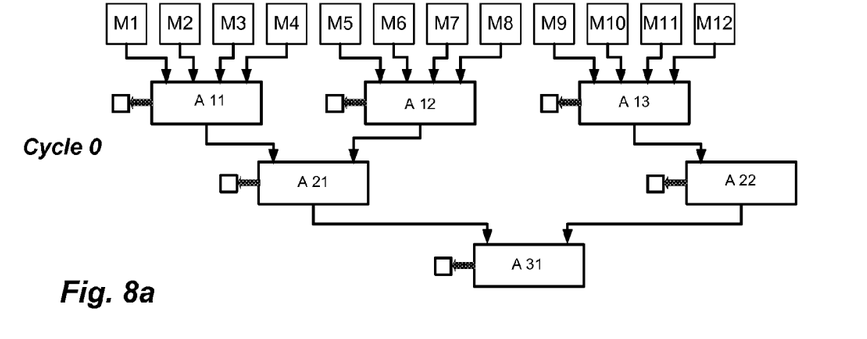
FIGS. 8a to 8f shows exemplary block diagrams to illustrate an operation according to an embodiment of the present invention.
Figure 8B:
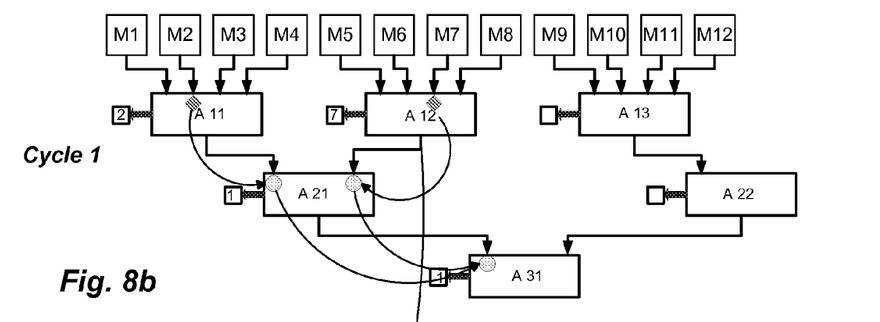

FIG. 8a starts at cycle 0 with the system being in an idle state. In FIG. 8b, at cycle 1 requests from requester M2 and M7 are received at arbiters A11 and A12. In view of the look-ahead mechanism, look-ahead signals are transferred from arbiters A11 and A12 to A21 and from arbiter A21 to arbiter A31. In other words, the look-ahead signals are transferred to all stages of the hierarchical system at cycle 1. It is to be noted here that in the figures look-ahead signals (look-ahead requests) are indicated by circles while pipeline requests are indicated by a rhomb.

At arbiters A11 and A12, the requests from requesters M2 and M7, respectively, are the only requests active and are therefore granted. At arbiter A21, two look-ahead requests from A11 and A12 are active. As no other pipeline request is active, the two look-ahead requests are arbitrated and the request at input 1 corresponding to A11 is granted. At arbiter A31, the look-ahead request from A21 is the only active request and therefore the first input corresponding to A21 is granted.

Figure 8C:
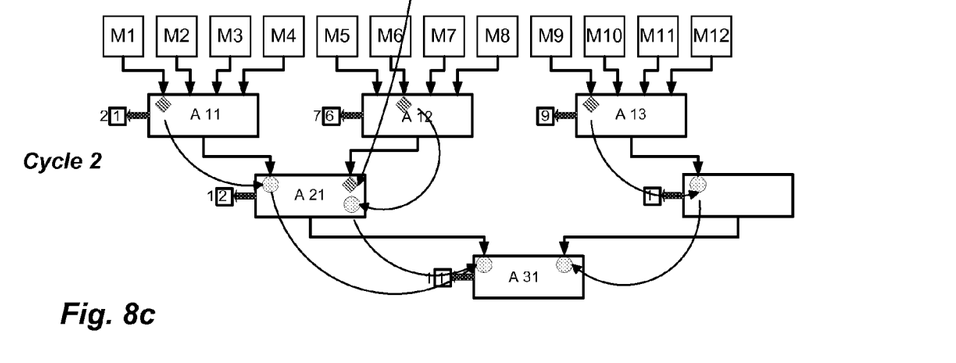

In cycle 2 shown in FIG. 8c, requests from requesters M1, M6 and M9 are received at arbiters A11, A12 and A13 and are granted as no other requests are active at the respective arbiters. Look-ahead requests are generated for each requester M1, M6 and M9 and are provided down the respective branches, i.e. to arbiters A21 and A31 for M1 and M6 and to arbiters A22 and A31 for M9. As to arbiter A21, in cycle 2 three requests are now active. Two look-ahead requests and one pipeline request. The pipeline request at arbiter A21 is a request corresponding to the request of requester M7 in the previous cycle. It is to be noted that no pipeline request is valid for the arbitration in the previous cycle at arbiter A11, as the request from A11, i.e. the look-ahead request from A11, corresponding to the request of M2 was granted by arbiter A21 already in the cycle before. As arbiter A21 contains now an active pipeline request, the pipelined request is prioritized over the look-ahead requests and grant is given to the input 2. The look-ahead request from M9 is granted at arbiters A13 and A22 as shown in FIG. 8c. Furthermore, at arbiter A31 where two look-ahead requests from A21 and A22 are now active input 1 corresponding to A21 is granted in arbitration.

Figure 8D:
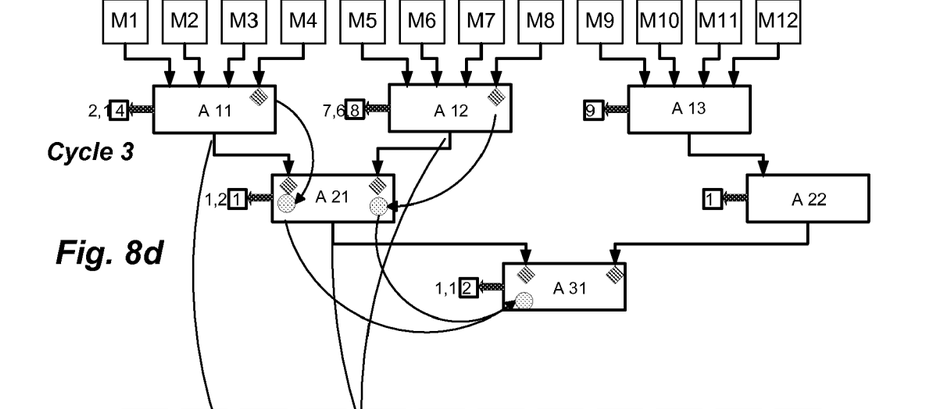

In cycle 3 shown in FIG. 8d, requests are received from requesters M4 and M8 at arbiters A11 and A12, respectively. Look-ahead requests are transferred to arbiters A21 and A31. Arbiter A21 has in cycle 3 four requests, two look-ahead requests and 2 pipeline request from A11 and A21, respectively. In accordance with the above, pipeline requests are prioritized, and therefore arbitration is performed between the two pipeline requests and grant is given to the first input.

Arbiter A31 has in cycle 3 two pipeline requests from arbiters A21 and A22 and one look-ahead request. Arbitration is performed among the pipeline requests and grant is given to the second input. It is to be noted at this point that in cycle 3 an only-pipelined operation is performed as each of the arbiters performing in cycle 3 arbitration is arbitrating among pipeline requests.

Figure 8E:
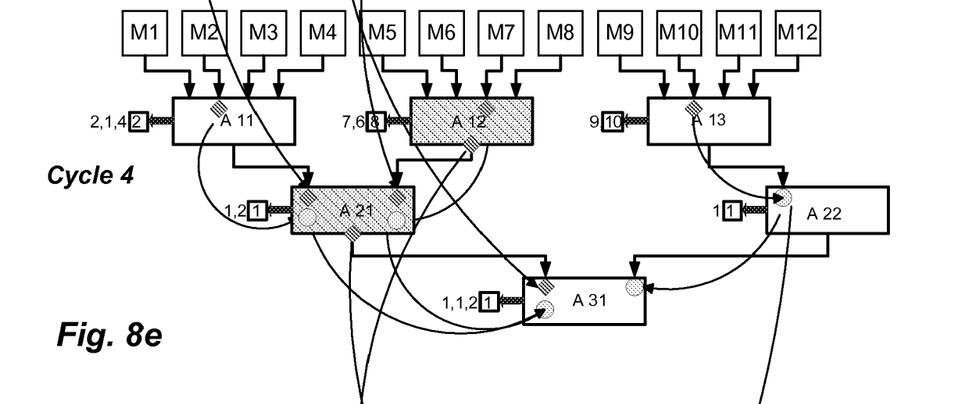

In cycle 4, new requests are received at arbiters A11, A12 and A13 from requesters M2, M7 and M10, respectively. Look-ahead requests are transferred to arbiters A21 and A31 for requests from M2 and M7 and look-ahead requests are transferred to arbiters A22 and A31 for the request from M10. In this cycle, the arbiters A21 and A31 all have active pipeline requests and therefore the look-ahead requests from M2 and M7 will not be taken into account. However, for the branch corresponding to M10, as the arbiters A13 and A22 have been idle in cycle 3, the look-ahead requests based on the request from M10 allow this request to get granted by arbiters A13 and A22 in one cycle. Note that the look-ahead request from M10 at arbiter A31 is discarded as there is an active pipeline request at input 1. Since the look-ahead requests from M10 was granted by arbiters A13 and A22, the request has advanced in one cycle two stages down the pipeline. Thus, the arbiters A13 and A22 are performing a parallel operation on the request from M10. Comparing to pure pipeline operation, where grant would have been given only from arbiter A13 for this request within this cycle, the request has "gained" one stage further in the pipeline.

As to arbiters A21, it is to be noted that the pipeline request resulting from the arbitration in the previous cycle (cycle 3) could not be transferred to the corresponding input of arbiter A31 as the request in arbiter A31 is still active because the input was not granted in the previous cycle.

Thus the output request from cycle 3 is maintained at the output of arbiter A21 and the arbiter A21 is blocked in this cycle for arbitration as indicated by the gray color. In addition as the input of arbiter 21 corresponding to A12 has not been granted in the previous cycle, arbiter A12 is blocked for arbitration in this cycle.

Arbiter A11 which has received a new request from requester M2 performs normal arbitration and grants this request as indicated in FIG. 8e.

Figure 8F:
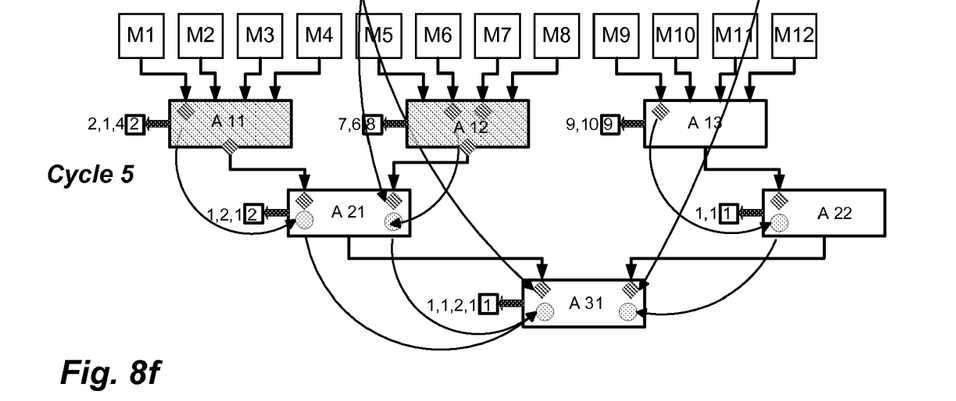

Moving now to cycle 5 shown in FIG. 8f, requests from M1, M6 and M9 are received and corresponding look-ahead requests are generated. However, as arbiters A21 and A31 have active pipeline requests, the look-ahead signals from M1 and M6 are not taken into account in the arbitration. For the request from M9, however, as arbiter A22 has no active pipeline request, the look-ahead request from M9 is allowed to get granted by both arbiters A13 and A22.

It is further to be noted that in cycle 5 arbiters A11 and A12 are blocked since arbiter A21 was blocked in the previous cycle and therefore active pipeline requests at the input of arbiter A21 could not be removed in the previous cycle to allow new requests to advance. Therefore, the pipeline request maintained at cycle 4 at the output of arbiter A21 is still not allowed to be transferred to arbiter A21. Furthermore, the request from M2 granted in cycle 4 could not be transferred at the end of cycle 4 to arbiter A21 as the old request is still pending at input 1 of arbiter A21 due to the blocking of arbiter A21 in the previous cycle.

Arbiter A21 performs during cycle 5 normal arbitration among the pending pipeline requests and grants input 2 corresponding to A12 in the arbitration process.

FIGS. 9a to 9f show now the data path system for the above described operation. As can be seen, in cycle 1 the multiplexer are idle or indefinite since no information of granted inputs are stored in the registers. At cycle 2, the multiplexer are set according to the stored information in the respective registers (compare for the information stored in the register at the end of the previous cycle, i.e. in cycle 1 shown in FIG. 8b) and data transfer is allowed for requester M2 to be transferred throughout all stages to the shared resource within one cycle. Furthermore, according to the setting of multiplexer D12, data from M7 can be transferred from requester M7 to the input of multiplexer D21 during cycle 2.

Figure 9A:
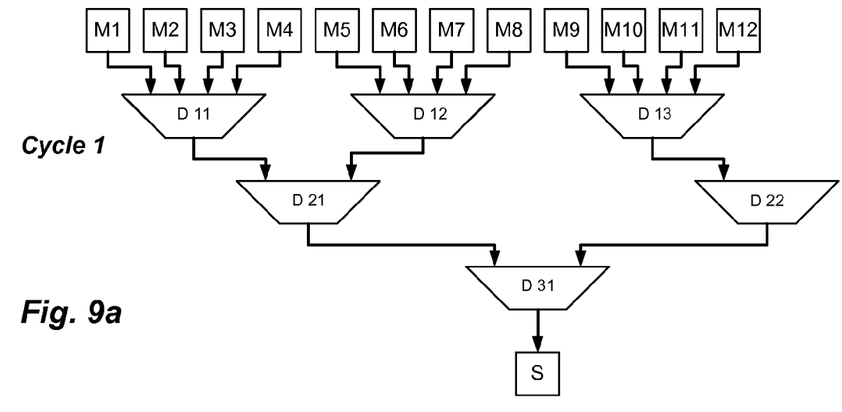
FIGS. 9a to 9f shows exemplary block diagrams to illustrate an operation according to an embodiment of the present invention.
Figure 9B:
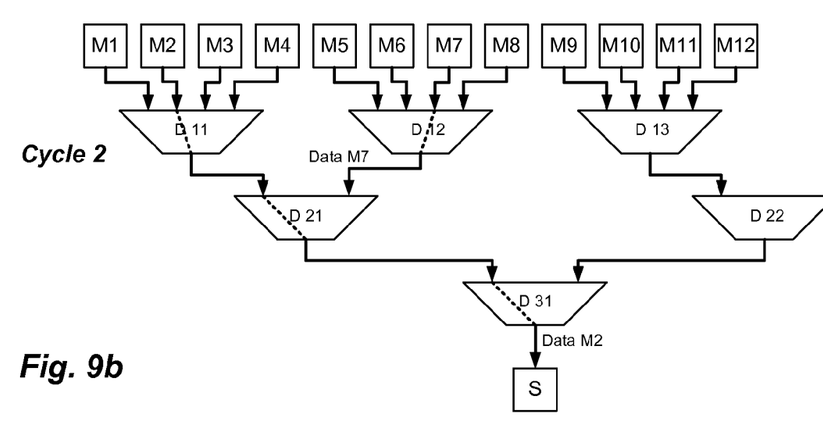
Figure 9C:
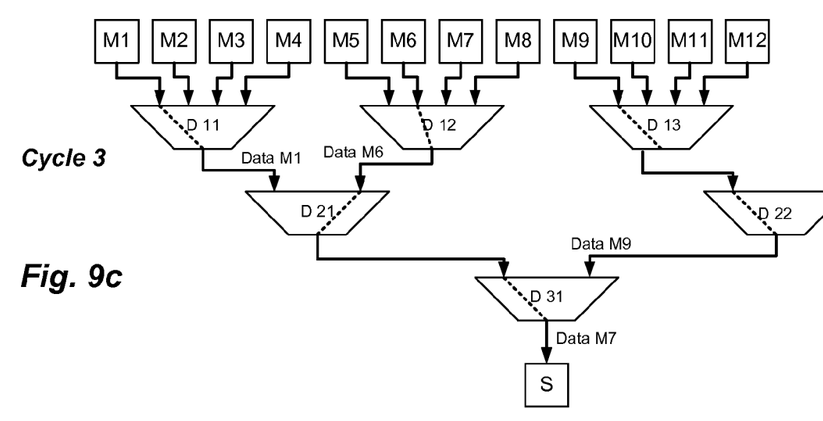

In cycle 3, the multiplexers are switched according to the actual information of each of the registers (see FIG. 8c). As can be seen in FIG. 9c, data from M7 is transferred from the input of multiplexer D21 to the shared resource during this cycle. Furthermore, data form M1 and data from M6 is allowed to advance down the pipeline until the respective inputs of multiplexer D21 during this cycle. In addition data from M9 is transferred during cycle 3 from the requester M9 to the input of multiplexer D31.

Figure 9D:
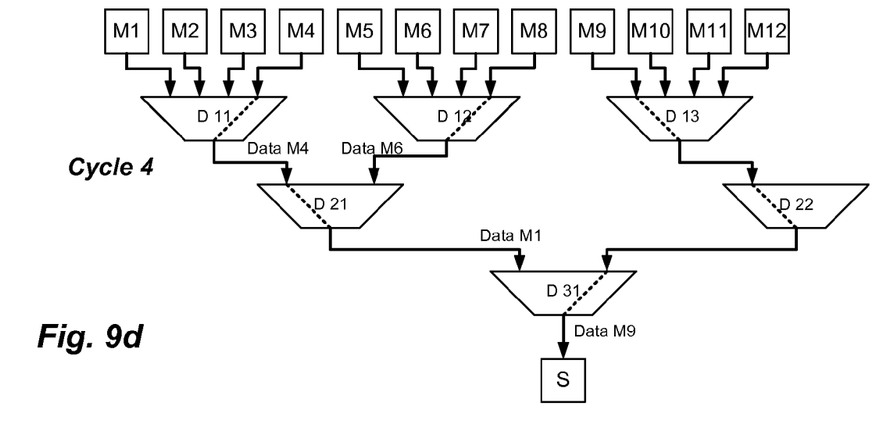

Moving now to cycle 4 shown in FIG. 9d, the multiplexer D31 is switched to input 2 allowing the data from M9 available at this input to be transferred to the shared resource. Furthermore, data from M1 advances down the pipeline from the input of multiplexer D21 to the input of multiplexer D31 and data from M4 advances from the requester M4 to the input of multiplexer D21. The data from M6 is not transferred in this cycle and is still available at the input 2 of multiplexer D21.

Figure 9E:
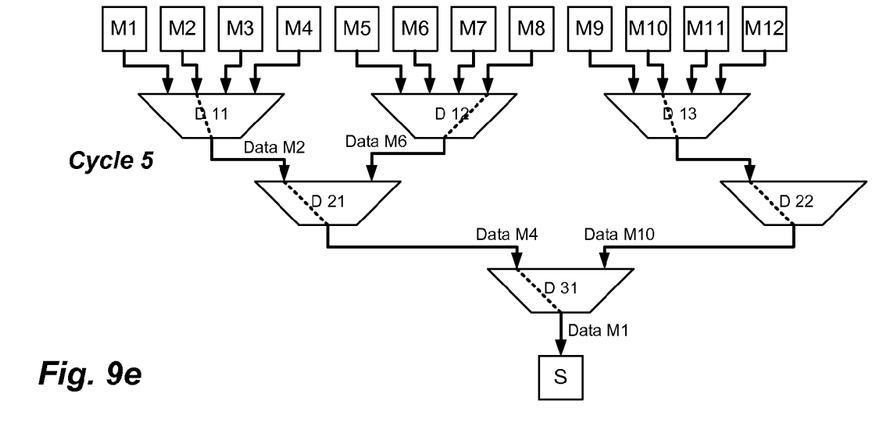

In cycle 5 shown in FIG. 9e, the data from M1 is transferred from the input of D31 to the shared resource and the data from M4 is transferred from the input of multiplexer D21 to the input of multiplexer D31. Furthermore, data from M2 is transferred from requester M2 to the input of multiplexer D21. Again, the data from M6 is not transferred. In addition, data from M10 is transferred from requester M10 to the input of multiplexer D31. Again it is to be noted here that data from M10 is transferred more than one stage in the hierarchical system.

Figure 9F:
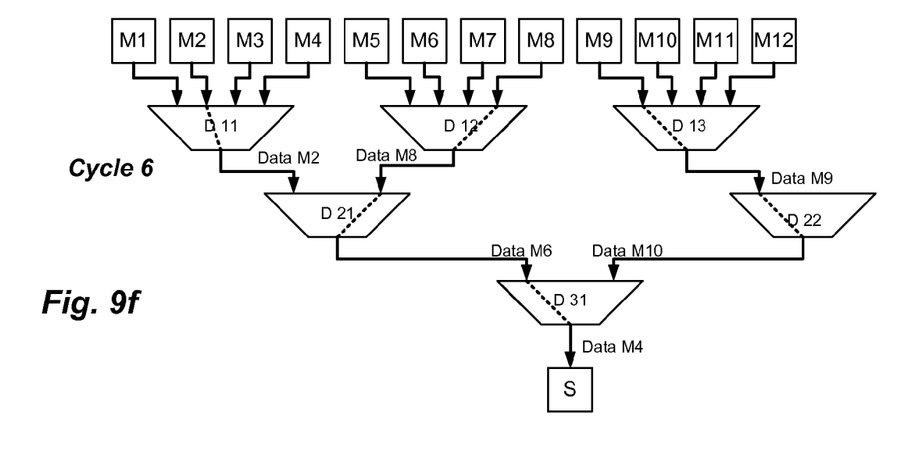

Moving now to cycle 6 shown in FIG. 9f, the data from M4 is transferred from the input from D31 to the shared source and the data from M6 is transferred from the input of multiplexer D21 to the input of multiplexer D31. Furthermore data from M9 are transferred from the requester M9 to the input of multiplexer D22.

Comparing the data transfer operation described with respect to FIGS. 9a-9f with the data transfer operation described with respect to FIGS. 6a to 6f, it is to be noticed that in the operation according to FIGS. 9a-9f data transfer already starts at cycle 2 while the system needed n−1 cycles, i.e. two cycles more, in the pure pipeline operation after an idle state of the system. It is a general feature of the above described embodiment, that after an idle state of the system, the first decision of grant can be made within one cycle due to the parallel operation independent of the number of stages of the hierarchical architecture and data can then be transferred already in the next cycle.

Figure 10:
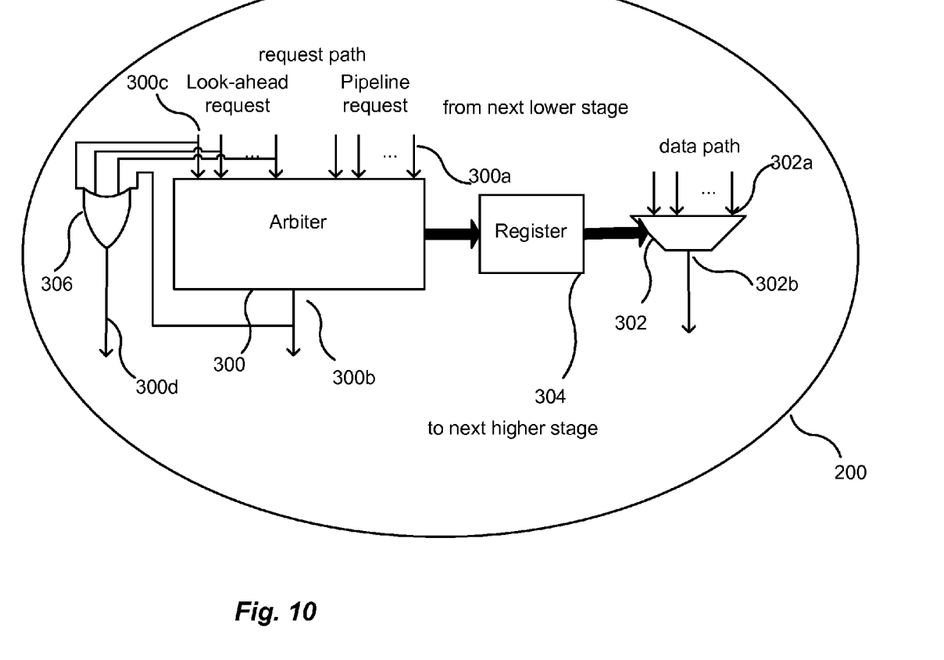
FIG. 10 shows a block diagram according to an embodiment of the present invention.

The above described embodiment overcomes therefore dead-times of the pipeline due to idle arbiters by generating look-ahead requests along the corresponding branch of the hierarchical system for each request received from a requester. A further modification may according to one embodiment be obtained by providing look-ahead requests for each request from a requester and for each pipeline request. This allows to "bridge gaps" (idle states) of the pipeline in the middle of the pipeline. The above operation may according to one embodiment provided by providing a further input to the plurality of inputs 300c for the OR-component, wherein the further input is connected to the output 300b as shown in FIG. 10.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

For example, while in the described embodiments, each of the requester is coupled to an arbiter of the first stage, other embodiments may be provided where some of the requesters are coupled to an arbiter of a higher stage, for example a second stage or even to the top-level stage.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
operating a plurality of arbiters in a pipelined mode, wherein in the pipelined mode a request advances one stage of the pipeline per clock cycle; and
operating at least a part of the plurality of arbiters in a non-pipelined operation, wherein in the non-pipelined operation a request advances at least two stages of the pipeline per clock cycle.

2. The method according to claim 1, wherein the pipelined mode comprises:
providing a first signal from a first arbiter to a second arbiter based on an arbitration at the first arbiter;
and wherein the non-pipelined operation comprises:
providing a second signal to the second arbiter independent of an arbitration at the first arbiter and arbitrating at the second arbiter based on the second signal.

3. The method according to claim 1, wherein the at least part of the plurality of arbiters is operated in a non-pipelined operation when the at least part of the plurality of arbiters has been idle or had no active pipeline request in the previous clock cycle.

4. The method according to claim 1, wherein the non-pipelined operation comprises a parallel arbitrating of a request of at least one requester of a plurality of requesters.

5. The method according to claim 1, further comprising: storing for each of the plurality of arbiters information indicating ports granted by a respective one of the plurality of arbiters.

6. The method according to claim 1, wherein the request advances in the non-pipelined mode all of the stages of the pipeline within one clock cycle.

7. The method according to claim 1, wherein, when the plurality of arbiters is idle, a requester is given grant by the plurality of arbiters for data transfer to a shared resource one clock cycle after the requester has issued a request for grant to the plurality of arbiters.

8. The method according to claim 2, wherein the second signal is provided in the pipelined and non-pipelined operation, and wherein in the pipelined operation arbitrating at the second arbiter based on the first signal is prioritized over arbitrating based on the second signal.

9. The method according to claim 2, wherein the plurality of arbiters are arbiters of a hierarchical arbitration system, the first signal is a pipeline request signal and the second signal is a look-ahead signal and
wherein the operating in the pipelined mode comprises providing the pipeline request signal from the first arbiter to a first input port of the second arbiter based on the arbitrating among the plurality of input ports at the first arbiter, wherein the second arbiter is implemented on a higher-level stage than the first arbiter;
and wherein the non-pipelined operation comprises providing the look-ahead signal to a first input port of the second arbiter of a higher-level stage, wherein the look-ahead signal is independent of an arbitrating in the first arbiter and providing a third signal indicating a grant for the first input port based on the look-ahead signal.

10. The method according to claim 5, further comprising providing a data path from a requester to a shared resource based on the information stored for each of the plurality of arbiters.

11. An arbiter system comprising:
a plurality of arbiters, wherein the plurality of arbiters is capable of operating in a pipelined operation, wherein in the pipelined mode a request advances one stage of the pipeline per clock cycle, and wherein at least a part of the plurality of arbiters is capable of selectively operating in a non-pipelined operation, wherein in the non-pipelined operation a request advances at least two stages of the pipeline per clock cycle.

12. The arbiter system according to claim 11, wherein the at least part of the plurality of arbiters is operated in a non-pipelined operation when the at least part of the plurality of arbiters is in an idle state.

13. The arbiter system according to claim 11, wherein the plurality of arbiters is configured to initiate, when the plurality of arbiters is initially idle, a data transfer for a requester one clock cycle after the requester has requested access.

14. The arbiter system according to claim 11, wherein the plurality of arbiters form a hierarchical arbitration system.

15. The arbiter system according to claim 14, wherein each of the plurality of arbiters is coupled to a corresponding register to store information indicating a port granted by each of the plurality of arbiters.

16. The arbiter system according to claim 15, wherein the corresponding register is coupled to a corresponding multiplexer to provide a data path from a requester to a shared source based on information stored in each of the corresponding register.

17. The arbiter system according to claim 16, wherein the plurality of arbiters is configured to provide in the pipelined operation a first signal from a first arbiter to a second arbiter of a next higher stage based on an arbitration at the first arbiter and wherein in the non-pipelined operation a second signal is provided to the second arbiter independent of an arbitration in the first arbiter.

18. The arbiter system according to claim 17, wherein the second signal is further provided in the pipelined operation, and wherein arbitration based on the first signal is prioritized over arbitration based on the second signal.

* * * * *